Sept. 10, 1940.　　　P. WIEBICKE　　　2,214,688
DIESEL MOTOR
Filed July 17, 1939　　2 Sheets-Sheet 1
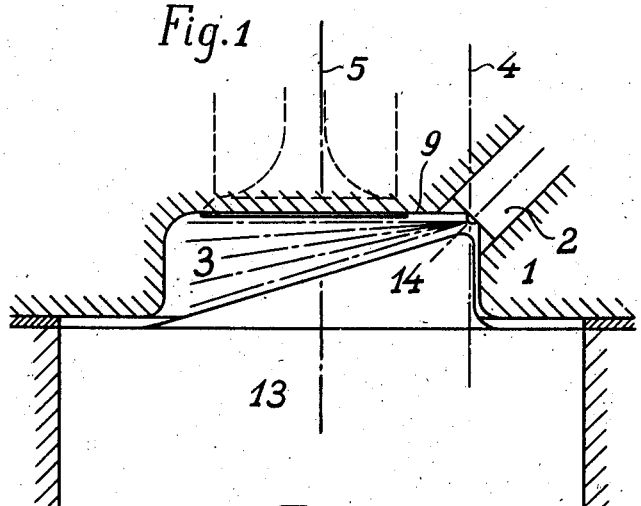
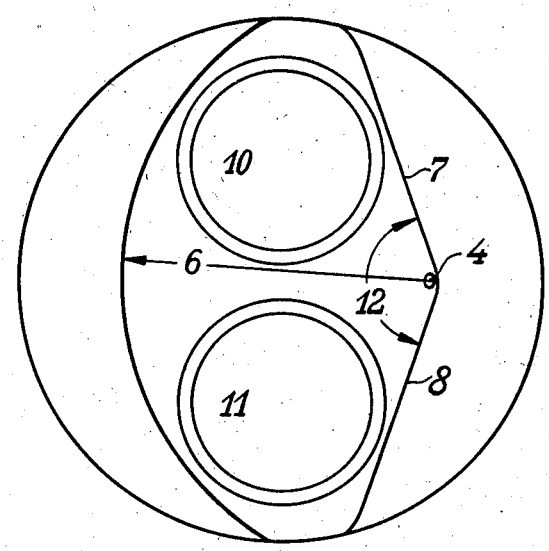
INVENTOR
PAUL WIEBICKE
BY Wolhaupter & Groff ATTYS

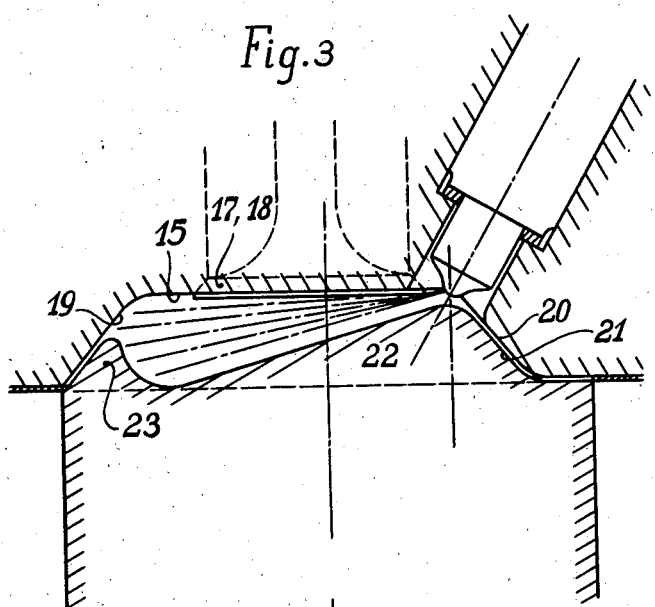
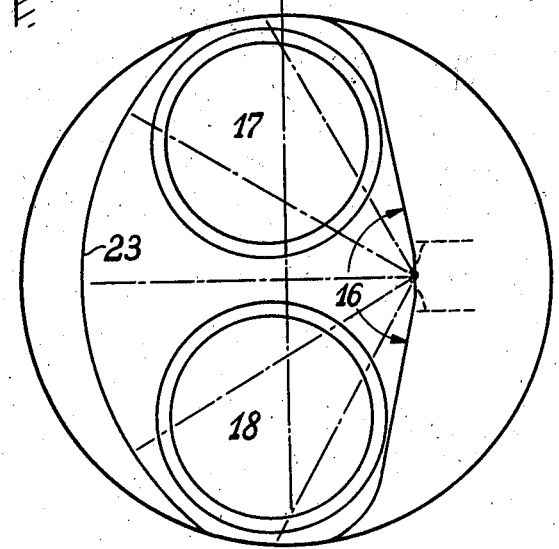

Patented Sept. 10, 1940

2,214,688

UNITED STATES PATENT OFFICE 2,214,688

DIESEL MOTOR

Paul Wiebicke, Nuremberg, Germany

Application July 17, 1939, Serial No. 284,978
In Germany July 19, 1938

4 Claims. (Cl. 123—32)

High-speed Diesel motors, especially such with a comparatively small diameter of the cylinder, as are used, for instance, in connection with motor cars, are to-day generally equipped with combustion spaces which are subdivided into chambers intended for particular purposes; such chambers are, for instance, separate combustion chambers, ante-chambers, air accumulating chambers, and the like. Owing to the irregular or fragmentary shape of such combustion chambers it is practically not possible to scavenge them properly and to charge or recharge them with fresh air. Combustion spaces of such simple designs as are used in connection with large scavenging and recharging motors, cannot, because of the above-mentioned reasons, be employed in connection with small high-speed motors also because, on the one hand, of the necessity to arrange the nozzle in a sufficiently long combustion space to provide for a sufficiently long development of the jet, and, on the other hand, of the requirement to displace the nozzle laterally, away from the cylinder axis so as to render it possible to do with only two valves which may be large (one inlet valve and one outlet valve).

The present invention relates to a particular design of a combustion space especially suited and useful for high-speed Diesel motors having a cylinder with a comparatively small diameter, said improved combustion space answering perfectly the requirements to which motors of the kind just mentioned must respond, and which presents also the most favorable relation as regards scavenging and charging. Said combustion space is, therefore, intended especially for motors of the said type where the nozzle lies outside the axis of the cylinder and only two valves are provided, the one constituting the inlet valve and serving for the scavenging and charging purpose, and the other constituting the outlet valve of the motor.

The characteristic features of this improved high-speed Diesel motor are, first, that the combustion space forms a conchoidal-shaped cavity which is provided in the cylinder cover and is bounded at one of its sides by a circularly curved wall; secondly, that the nozzle is arranged in the centre of the curve to which said curvature pertains; thirdly, that the top surface of said space where the two above-mentioned valves are located is plane, and fourthly, that the boundary at the bottom of the said space is formed by an obliquely conical projection on the top of the piston, the arrangement being such that the top surface of said cone rises in a direction relative to the nozzle which is located outside the axis of the cylinder in an oblique direction thereto and the apex of the said cone lies adjacent to the centre of the curve, as already mentioned.

There is obtained in this way a closed combustion space the height (or depth) of which increases downwardly from the nozzle orifice to the end of the jet formed by the fuel injected by the nozzle, whereby the possibility is presented that the jet can develop completely undisturbed, in that the shape of the combustion space designed as stated is accommodated to the enlarging or expanding jet, and that the scavenging and the charging or re-charging can be effected in the most satisfactory manner.

The invention is illustrated diagrammatically and by way of example on the accompanying drawings wherein Figure 1 is an axial section through the uppermost portion of a high-speed Diesel motor designed according to this invention, showing especially the cylinder cover with the combustion-space forming cavity therein and the top of the piston with the projection located in said cavity.

Figure 2 is a bottom view of the cylinder cover.

Figure 3 is a view similar to Fig. 1 and shows a modification, and

Fig. 4 is a bottom view of the cylinder cover pertaining to the modification of Fig. 3.

Referring to Fig. 1, I denotes the cylinder head, and 2 the nozzle which is located laterally from the axis of the cylinder and obliquely with respect thereto, as shown. 3 denotes the combustion space which is provided in the cylinder cover and has opposite the nozzle a circularly curved wall (Fig. 2), the centre of which, i. e. of the generating circle, lies in a line 4 extending parallel to the line 5 which indicates the axis of the cylinder. In said line 4 lies also the orifice of the nozzle, opposite to the curved wall, and from said orifice extend two radial walls 7 and 8 which are, therefore, likewise located opposite to the said curved wall of the combustion space 3. 12 denotes the angle formed by and between said walls 7 and 8.

On the top of the piston 13 is the oblique cone 14, the circumferential surface of which corresponds with the circumferential shape of the combustion space, and whose top surface is oblique, and rises from the lower edge of the circularly curved wall of said space to the proximity of the jet orifice of the nozzle where the apex of the cone is located. The height of the combustion space increases in the direction from the injection orifice to the circularly curved wall, practically in the direction of the radius 6 (Fig. 2), the thus obtained shape permitting the jet to enlarge or expand in the most efficacious manner, without any disturbance by obstacles of any kind, and also the scavenging, as well as the charging or recharging can be carried out most satisfactorily.

In Fig. 2, 10 and 11 denote the two valves, the largest possible size of which is determined by the length of the radius 6.

Referring to Figs. 3 and 4, showing a form in which is chosen a long radius of the circularly curved wall, this permits the employment of still larger valves, such as 17 and 18, in the bottom 15 of the compression space. Owing to said longer radius, the curved boundary wall 19 is, of course, otherwise shaped than in Fig. 2, and also the angle 16 between the radial boundary walls of said space is larger, as appears clearly from Fig. 4. Another feature of this modified constructional form is that the boundary walls 19 and 20 of the combustion chamber are oblique, as shown in Fig. 3, and in correspondence therewith also the circumferential wall of the projection 22 of the piston is conically oblique so as to fit to and into that combustion space. Still another feature of this modification is that an elevation 23 (Fig. 3) is provided at the lowermost portion of said projection whereby the creation of a dead angle of the respective portion of the combustion space is prevented.

I claim:

1. In a high-speed Diesel motor, a cylinder constituting a main combustion chamber, a piston operable in said cylinder, an auxiliary combustion chamber formed on the head of said cylinder and in communication with said main combustion chamber, a discharge nozzle situated on one side of said auxiliary combustion chamber, said auxiliary combustion chamber being of conchoidal shape and having a circularly arcuate wall situated opposite said nozzle and further having straight radial walls extending radially from said nozzle to the ends of said arcuate wall, said piston being provided with a terminal projection of conchoidal contour adapted to fit tightly in said auxiliary combustion chamber, the free surface of said projection being sloped obliquely with reference to the axis of said piston from an elevated point which in the extreme position of travel of said piston is adjacent said nozzle and which surface then extends downwardly to the lower edge of said arcuate wall adjacent said cylinder head.

2. In a high-speed Diesel motor, a cylinder constituting a main combustion chamber, a piston operable in said cylinder, an auxiliary combustion chamber formed on the head of said cylinder and in communication with said main combustion chamber, a discharge nozzle situated an one side of said auxiliary combustion chamber, said auxiliary combustion chamber being of conchoidal shape and having a circularly actuate wall situated opposite said nozzle and further having straight radial walls extending radially from said nozzle to the ends of said arcuate wall, and said piston being provided with a terminal projection of conchoidal contour adapted to fit tightly in said auxiliary combustion chamber, the free surface of said projection being a sector of the nappe of an oblique circular cone whose apex in the extreme position of travel of said piston is adjacent said nozzle and whose base is then substantially the lower edge of said circular wall adjacent said cylinder head.

3. In a high-speed Diesel motor, a cylinder constituting a main combustion chamber, a piston operable in said main combustion chamber, an auxiliary combustion chamber formed on the head of said cylinder and in communication with said main combustion chamber, a discharge nozzle situated on one side of said auxiliary combustion chamber, said auxiliary combustion chamber having a conchoidal base comprising a circular arc whose center is adjacent said nozzle and further comprising straight radii extending radially from the position of said nozzle to the ends of said arc, the walls of said auxiliary combustion chamber being sloped inwardly obliquely with reference to said base thereof, and said piston being provided with a terminal projection shaped to fit into said auxiliary combustion chamber and comprising the nappe of an oblique cone whose apex in the extreme position of travel of said piston is adjacent said nozzle.

4. In a high-speed Diesel motor, a cylinder constituting a main combustion chamber, a piston operable in said main combustion chamber, an auxiliary combustion chamber formed on the head of said cylinder and in communication with said main combustion chamber, a discharge nozzle situated on one side of said auxiliary combustion chamber, said auxiliary combustion chamber having a conchoidal base comprising a circular arc whose center is adjacent said nozzle and further comprising straight radii extending radially from the position of said nozzle to the ends of said arc, the walls of said auxiliary combustion chamber being sloped inwardly obliquely with reference to said base thereof, and said piston being provided with a terminal projection shaped to fit into said auxiliary combustion chamber and comprising the nappe of an oblique cone whose apex in the extreme position of travel of said piston is adjacent said nozzle and further comprising an elevated peripheral ridge adjacent said arc.

PAUL WIEBICKE.